No. 627,091. Patented June 20, 1899.
P. O. BLECHSCHMIDT.
WHEEL PLOW.
(Application filed Dec. 30, 1897.)
(No Model.) 3 Sheets—Sheet 1.
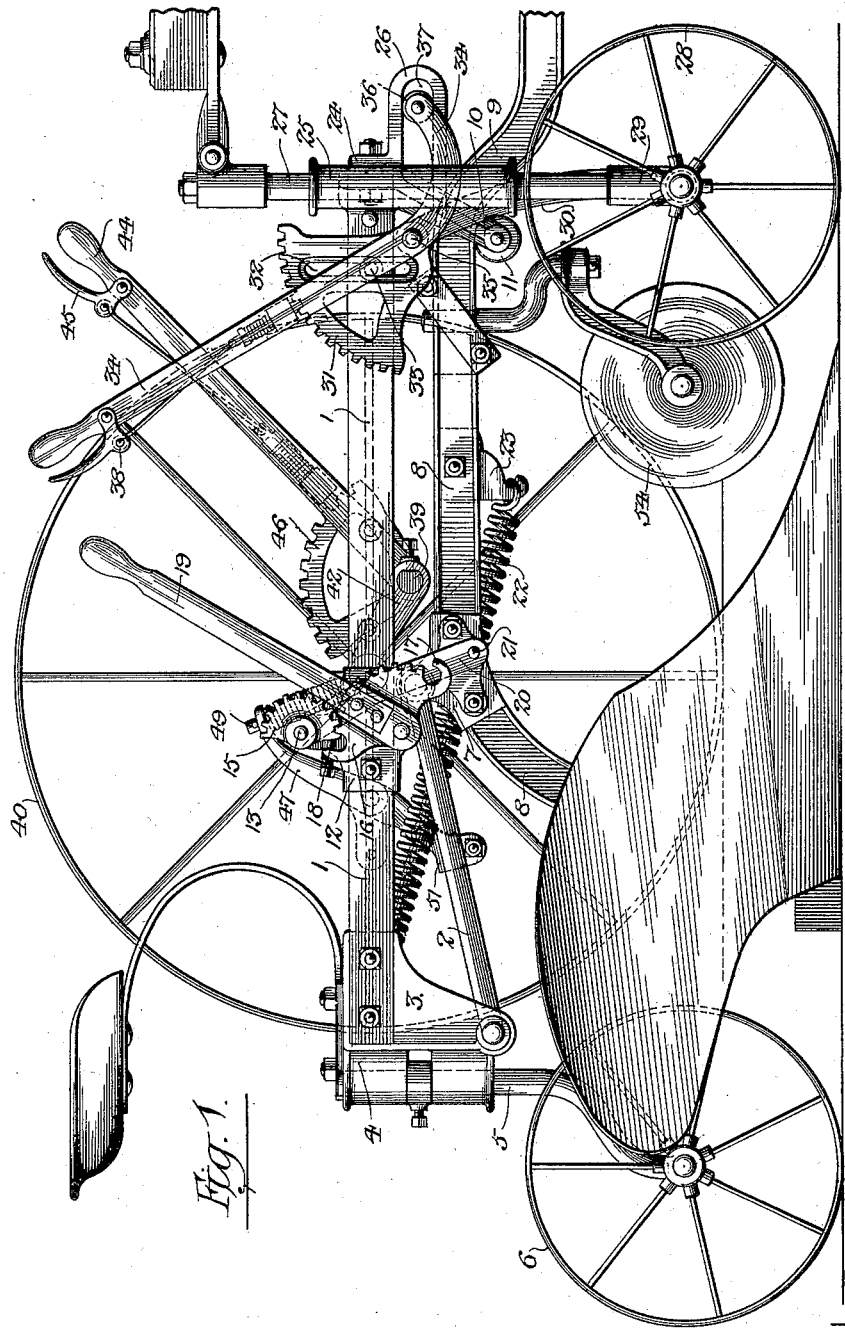
Witnesses:-
Louis M. F. Whitehead
V. B. Hillyard
Inventor:-
Paul O. Blechschmidt
By his Attorneys,
C. A. Snow & Co.

No. 627,091. Patented June 20, 1899.
P. O. BLECHSCHMIDT.
WHEEL PLOW.
(Application filed Dec. 30, 1897.)
(No Model.) 3 Sheets—Sheet 2.
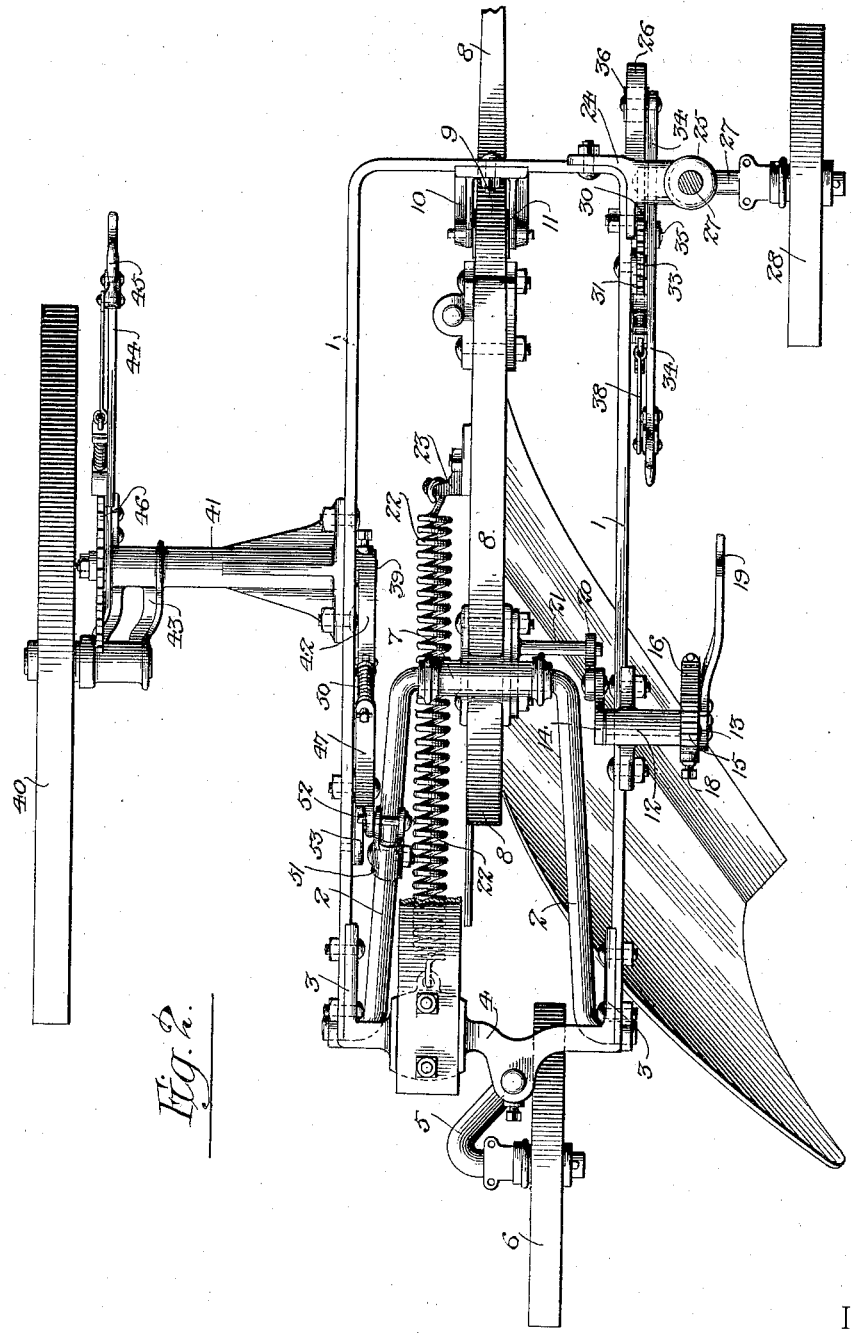
Witnesses:— Inventor:—
Louis M. F. Whitehead Paul O. Blechschmidt
V. B. Hillyard By his Attorneys,
C. A. Snow & Co.

No. 627,091. P. O. BLECHSCHMIDT. WHEEL PLOW. (Application filed Dec. 30, 1897.)
(No Model.) 3 Sheets—Sheet 3.
Patented June 20, 1899.
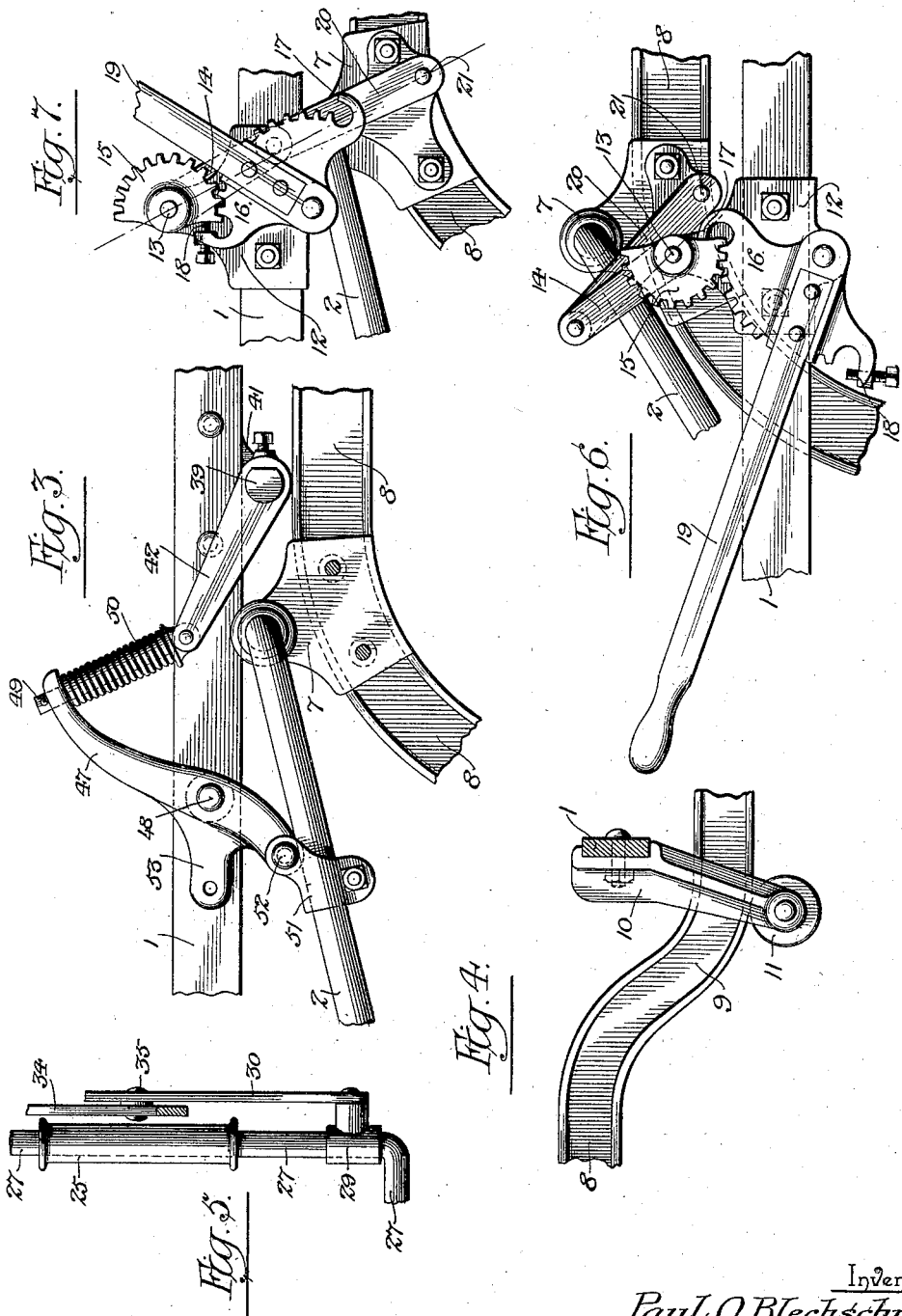
Witnesses:
Louis M. F. Whitehead
U. B. Hillyard.
Inventor:—
Paul O. Blechschmidt
By his Attorneys,
C. A. Snow & Co.

UNITED STATES PATENT OFFICE.

PAUL O. BLECHSCHMIDT, OF ROCK ISLAND, ILLINOIS.

WHEEL-PLOW.

SPECIFICATION forming part of Letters Patent No. 627,091, dated June 20, 1899.

Application filed December 30, 1897. Serial No. 664,507. (No model.)

*To all whom it may concern:*

Be it known that I, PAUL O. BLECHSCHMIDT, a citizen of the United States, residing at Rock Island, in the county of Rock Island and State of Illinois, have invented a new and useful Wheel-Plow, of which the following is a specification.

This invention has for its object to improve the general construction of wheel-plows and to simplify the mechanisms resorted to for securing the various adjustments and relative movements of the working parts essential for adapting the implement to the work in hand and the nature and condition of the soil to be operated upon.

An important feature of the invention is to combine with the plow, frame, operating-lever, and crank means comprising a link and intermeshing gearing whereby the plow can be raised, lowered, and locked and the frame leveled and which will admit of the plow moving vertically when at its lowest position, so as to ride over unyielding obstructions, such as stones and roots, whereby the implement is prevented from undue strain and serious injury.

A further purpose of the invention is to combine with the land-wheel connections whereby it may be operated independently or simultaneously with the plow, so that a raising and lowering of the latter will effect a corresponding and proportionate movement of the land-wheel independently of the hand adjusting devices, so as to maintain the frame approximately in a level condition without requiring any special attention on the part of the driver.

The invention also has for its object to interpose rolling and rocking connections between the front end of the frame, the segment, and the operating-lever, whereby the upward movement of the frame is easily and readily effected without requiring any especial effort because of the peculiar disposition of the pivotal and rolling connections.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a wheel-plow embodying the essential features of this invention, showing the plow in its lowest position. Fig. 2 is a top plan view, the standard of the front furrow-wheel being in section. Fig. 3 is a detail view of the connections provided between the bail and the axle of the land-wheel. Fig. 4 is a detail view of the offset or ogee portion of the plow-beam and the roller-bracket therefor. Fig. 5 is a detail view of the sleeve loosely mounted upon the lower end of the front furrow-wheel standard and the pendent arm of the segment pivoted thereto. Fig. 6 is a detail view of the instrumentalities whereby the plow is raised and lowered and locked, showing their relative disposition when the plow is elevated. Fig. 7 is a view of the parts illustrated in Fig. 6, showing their relation when the plow is lowered.

Corresponding and like parts are referred to in the following description and indicated in the several views of the accompanying drawings by the same reference characters.

The frame 1 of the implement may be of any approved construction, according to the style of the machine and the relative location of the working parts attached thereto. The bail 2 has pivotal connection at its rear end with brackets 3, pendent from the rear end of the frame and preferably forming a part of the rear bar 4, to which is journaled the standard 5 of the rear furrow-wheel 6. A bearing-bracket 7 is bolted to the plow-beam 8 and is mounted upon the forward or closed end of the bail, so as to turn thereon and admit of the various adjustments of the plow. The plow-beam has an offset portion of substantially ogee form near its front end, as shown at 9, which is adapted to move freely through a roller-bracket 10, bolted or otherwise secured to the front end of the frame. This bracket is forked at its lower end, and a roller 11 operates in the space formed between the fork sides and is mounted upon a pin supported in the ends thereof. When the plow-beam is at its lowest position, as shown in Fig. 1, the offset portion 9 is forward of the roller 11, thereby admitting of the front end of the beam having a free vertical play within certain limits, sufficient space being provided between the upper portion of the roller and the crotch of the fork to allow of the vertical movements. When the plow is raised, the offset portion 9 will come in the rear of the roller-bracket 10, and the beam coming nearer the frame 1 will be prevented from having the vertical play provided for when the plow is at its lowest position. The plow when raised and lowered receives a simultaneous longitudinal movement, which causes the offset portion 9 to ride upon the roller 11, whereby the front end of the plow-beam is correspondingly raised and lowered with the rear end, thereby maintaining the plow in a substantially level position. The parts are disposed and proportioned so that the plow-beam will receive a corresponding movement throughout its length when changing the plow from one position to another.

A bracket 12 is fastened to one side of the frame 1 and has upper and lower bearings extending horizontally in parallel relation. A shaft 13 is journaled in the upper bearing and is provided at its inner end with a crank 14 and at its outer end with a segment-gear 15. A larger segment or mutilated gear 16 is journaled in the lower bearing and intermeshes with the segment-gear 15 and is provided at its ends with stops 17 and 18 to engage with the ends of the segment-gear 15 and hold the plow at its extreme adjustments in locked relation. An operating-lever 19 is applied to the segment-gear 16 for moving the latter and the plow when it is required to shift the latter from one position to another. The stop 17 is rigid and is formed by having a portion of the segment-gear projecting beyond the plane of the teeth, so as to engage with one end of the segment-gear 15 and hold the plow locked when elevated. The stop 18 is adjustable and consists of a set-screw mounted in an extension of the segment-gear 16, and this adjustable stop engages with the opposite end of the segment-gear 15 and limits the downward movement of the plow when at its lowest position, as indicated in Figs. 1 and 7. A link 20 connects the crank 14 with an arm 21, projecting laterally from the plow-beam, the pivotal connections between the link and parts 14 and 21 being disposed with reference to the shaft 13, so that when the plow is raised the shaft 13 will be in the rear of a straight line connecting the pivotal joints of the link with the parts 14 and 21, thereby forming a lock-joint and obviating the necessity for a hand latch and segment or like means for securing the plow when elevated. When the plow is lowered, the pivotal connection between the link 20 and crank 14 will be forward of a straight line passing through the shaft 13 and the pivotal connection of the link with the bracket 21, as clearly indicated in Figs. 1 and 7, thereby admitting of the plow moving vertically, so as to ride over a stone, root, or other unyielding obstruction, thereby obviating the crippling of the machine or the straining of the parts. A spring 22 is interposed between the plow-beam and the frame and serves to counterbalance and assist materially in moving the plow to a raised position. This spring is connected at its front end to a bracket-lug 23, secured to the plow-beam, and inclines rearwardly and upwardly and is attached at its rear end to the cross-bar 4. When the lever 19 is thrown forwardly, as shown by Figs. 1 and 7, the plow is lowered and when thrown rearwardly, as indicated in Fig. 6, the plow is elevated.

An essential feature of the construction described is that the gears 15 and 16 or equivalent operative connections between the lever 19 and the shaft 13 are so related that a quarter or less movement of the lever 19 will swing the lifting-crank more than a half-circle, and thereby lock the link in either of its extreme positions.

A bracket 24 is bolted or otherwise fastened to the front portion of the frame 1, preferably at the corner remote from the landside, and this bracket is provided with a vertical sleeve 25 and a forward slotted extension 26, the sleeve 25 receiving the standard 27 of the front furrow-wheel 28. A sleeve 29 is loosely mounted upon the lower portion of the standard 27, and the pendent arm 30 of the notched segment 31 has pivotal connection at its lower end therewith, said segment having a vertical slot 32, in which operates a pulley 33, by means of which the front end of the frame is guided in its vertical movements. The pulley 33 is flanged and overlaps the edge portions bordering upon the slot 32, so as to retain the frame 1 and notched segment 31 in normal relation. An operating-lever 34 is fulcrumed at 35 to the notched segment 31, and the end portion beyond the pivot 35 is curved forwardly and is provided with a roller 36, located in the slot 37 of the extension 26. This lever is provided with the usual hand-latch 38, which coöperates with the notched segment 31 to hold the frame in an adjusted position. When the upper end of the lever 34 is moved rearwardly and downwardly, the front end of the frame 1 is raised, and when moved forwardly the front portion of the frame is correspondingly lowered, the adjustments being due to the roller 36 bearing against the sides of the extension 26, bordering upon the slot 37. As previously stated, the frame is directed in its vertical movements by the pulley 33, traveling in the slot 32 of the segment 31.

The axle 39 of the land-wheel 40 is mounted in a bearing 41, secured to a side of the frame 1, and is provided at its inner end with an arm 42, secured so as to turn therewith. The spindle upon which the land-wheel is journaled is carried by an arm 43, mounted to turn independently upon the axle 39. An operating-lever 44 is secured to the arm 43, so as to move therewith, and is provided with a hand-latch 45 to engage with a notched segment 46, by means of which the arm 43 and axle 39 are secured together in an adjusted position, the notched segment 46 being secured to the outer end of the axle 39, so as to be rigid therewith. A lever 47 is fulcrumed at 48 to the side bar of the frame 1, to which the bearing 41 is attached, and its longer arm is apertured to receive a pin 49, which works loosely therethrough, the lower end of the pin having pivotal connection with the arm 42. A spring 50 is mounted upon the pin 49 and is confined between a shoulder at the lower end thereof and the arm 47 and serves to relieve the frame of any jar and jolt incident to the land-wheel 40 passing over rough and uneven ground. The lower end of the lever 47 is connected with a side member of the bail 2 by means of a clip 51 and a pin or bolt 52, the latter passing through registering openings in the lower end of the lever and the upper portion of the clip.

When the axle 39 is coupled to the bail 2 in the manner described, an adjustment of the plow causes a corresponding movement of the land-wheel, as will be readily understood; but should it be required to disconnect the axle 39 from the bail 2 the pin or bolt 52 is withdrawn from engagement with the clip 51 and is passed through registering openings in an extension 53 of the lever 47 and the contiguous frame-bar, thereby fixing the position of the lever 47 and enabling the bail and plow-beam to move without causing any corresponding movement on the part of the land-wheel. When the position of the lever 47 is fixed, the land-wheel can be adjusted by means of the lever 44 in the ordinary manner. The rotary colter 54 is applied to the plow-beam in any of the usual ways and operates in the manner and for the purpose for which such devices are provided.

Having thus described the invention, what is claimed as new is—

1. In a wheel-plow, the combination with the frame having a longitudinally-slotted portion, and having the plow attached thereto, and a furrow or ground wheel, of a segment supported by means of the said wheel independently of the frame and plow, and a lever fulcrumed to the said segment and having a roller located in the aforesaid slotted portion of the frame so as to effect a vertical adjustment of the frame, said lever having a latch to coöperate with the segment to hold the frame in an adjusted position, substantially as described.

2. In a wheel-plow, the combination of a frame having a longitudinally-slotted portion, and having the plow connected directly therewith, a furrow or ground wheel, a segment having pivotal connection with the standard of the said wheel, a lever fulcrumed to the segment and having a roller located and operating in the longitudinally-slotted portion of the frame, and provided with a latch to interlock with the said segment to hold the lever in an adjusted position, and means for directing the frame in its vertical movements, consisting of a pulley and guide between the frame and the aforedescribed segment, substantially as set forth.

3. In a wheel-plow, the combination of a frame having a longitudinally-slotted portion and carrying the plow, a furrow or ground wheel, a notched segment having pivotal connection with the aforesaid wheel and provided with a vertical slot, a lever fulcrumed to the segment and having a roller located and operating in the aforedescribed slotted portion of the frame, and provided with a latch to coöperate with the segment to retain the parts in an adjusted position, and a pulley carried by the frame and operating in the vertical slot of the segment, substantially as and for the purpose set forth.

4. In a wheel-plow, the combination of a frame, a bracket applied thereto and having a vertical sleeve and a longitudinally-slotted extension, a furrow or ground wheel having its standard mounted in the said sleeve, a second sleeve loosely mounted upon the lower portion of the standard, a notched segment having a pendent arm pivoted to the aforesaid second sleeve, a lever fulcrumed to the segment and having a roller located and operating in the slot of the bracket, and provided with a latch to coöperate with the segment, and a flanged pulley applied to the frame and operating in a vertical guide-slot formed in the aforesaid notched segment, substantially as set forth.

5. In a wheel-plow, the combination of a forked bracket applied to the frame, a roller journaled between the lower ends of the fork sides, a plow-beam having an offset portion of approximately ogee form adapted to operate through the fork of the bracket and ride upon the roller thereof, and means applied to the plow-beam for imparting a simultaneous longitudinal and vertical movement thereto, whereby the offset portion is caused to ride upon the said roller and is correspondingly raised or lowered, substantially as set forth.

6. In an agricultural implement, the combination with the frame, and a beam bearing a plow or other earth-treating device, of a crank supported by the frame, a link connecting the crank with the beam, a segment-gear having connection with the crank so as to move therewith, and a second segment-gear supported by the frame and intermeshing with the first-mentioned segment-gear, and provided with terminal stops to engage therewith, and adapted to be turned to cause a vertical movement of the aforesaid beam, substantially as and for the purpose set forth.

7. In an agricultural implement, the combination with the frame, and a beam bearing a plow or like device, of a crank journaled to the frame, a link connecting the crank with the beam, a segment-gear having connection with the crank so as to move therewith, and a second segment-gear intermeshing with the first-mentioned segment-gear and supported by the said frame, and provided with terminal stops to engage with the end portions of the first-mentioned segment-gear and limit the movements of the parts, one of the terminal stops being adjustable, substantially as and for the purpose set forth.

8. In an agricultural implement, the combination with the frame, and a beam bearing a plow or like device, of a shaft journaled to the frame, a crank at one end of the shaft, a link connection between the crank and the said beam, a segment-gear applied to the opposite end of the said shaft so as to turn therewith, a second segment-gear intermeshing with the first-mentioned segment-gear and provided with terminal stops which engage with the extremities of the first-mentioned segment-gear to limit the movements of the parts, the rear stop being adjustable to limit the downward movement of the beam and provide for its independent vertical movement to permit of the plow riding over unyielding obstructions, and an operating-lever applied to the segment-gear having the terminal stops, substantially as set forth.

9. In an agricultural implement of the wheel type, the combination with the frame, and land-wheel, of an arm secured to the axle of the land-wheel, a lever or like part applied to the frame, a pin interposed between the said lever and arm and pivoted to the one and having a sliding connection with the other, and a spring mounted upon the said pin and interposed between the parts connected thereby, substantially as set forth.

10. In an agricultural implement of the wheel type, the combination with the frame, a land-wheel, and means for adjusting the land-wheel, consisting of a lever and segment, of an arm secured to the axle of the land-wheel so as to move therewith, a lever or like part applied to the frame, a pin pivoted to the arm and working loosely through an opening in the said lever, and a spring mounted upon the pin and confined between a portion thereof and the part through which the pin moves, as and for the purpose set forth.

11. In a wheel-plow, the combination of a frame, a land-wheel, a plow-beam, a bail connecting the plow-beam with the frame, means for adjusting the plow-beam vertically, a lever fulcrumed to the frame and adapted to be secured to either the bail or frame, an arm applied to the axle of the land-wheel, and a spring connection between the lever and arm, substantially as set forth.

12. In a wheel-plow, the combination of a frame, a land-wheel, means for adjusting the land-wheel for leveling the frame, a plow-beam, a bail connecting the plow-beam with the frame, means for adjusting the plow-beam vertically, a lever fulcrumed to the frame and adapted to be secured to either the frame or bail, an arm applied to the axle of the land-wheel, and a spring connection between the said arm and the lever fulcrumed to the frame, substantially as and for the purpose specified.

13. In a machine of the class described, the combination with the wheeled frame, and the movable plow-beam, of the shaft journaled on the frame and carrying at its inner end a lifting-crank having a link connection with the beam, and the operating-lever having operative connection with the outer end of the shaft, said connection providing means whereby a quarter or less throw of the lever will cause the lifting-crank to swing through more than a half-circle, and thereby lock the link connection in either of its extreme positions, substantially as set forth.

In testimony that I claim the foregoing as my own I have hereto affixed my signature in the presence of two witnesses.

PAUL O. BLECHSCHMIDT.

Witnesses:
   C. GUSTAV BLECHSCHMIDT,
   JOHN RINCK.